(12) United States Patent
Banat et al.

(10) Patent No.: US 9,611,342 B2
(45) Date of Patent: Apr. 4, 2017

(54) MULTI-ZONE REACTOR FOR CONTINUOUS POLYMERIZATION OF ALPHA OLEFIN MONOMERS

(71) Applicants: SAUDI BASIC INDUSTRIES CORPORATION, Riyadh (SA); SABIC GLOBAL TECHNOLOGIES B.V., Bergen op Zoom (NL)

(72) Inventors: Yahya Banat, Geleen (NL); Jose Fernando Cevallos-Candau, Charleston, WV (US)

(73) Assignees: SABIC GLOBAL TECHNOLOGIES B.V., Bergen Op Zoom (NL); SAUDI BASIC INDUSTRIES CORPORATION, Riyadh (SA)

( * ) Notice: Subject to any disclaimer, the term of this patent is extended or adjusted under 35 U.S.C. 154(b) by 0 days.

(21) Appl. No.: 15/100,493

(22) PCT Filed: Nov. 24, 2014

(86) PCT No.: PCT/EP2014/075412
§ 371 (c)(1),
(2) Date: May 31, 2016

(87) PCT Pub. No.: WO2015/078816
PCT Pub. Date: Jun. 4, 2015

(65) Prior Publication Data
US 2016/0297900 A1 Oct. 13, 2016

Related U.S. Application Data

(60) Provisional application No. 61/929,597, filed on Jan. 21, 2014.

(30) Foreign Application Priority Data

Nov. 29, 2013 (EP) ..................................... 13195141

(51) Int. Cl.
*C08F 10/06* (2006.01)
*C08F 2/34* (2006.01)
(Continued)

(52) U.S. Cl.
CPC ............... *C08F 10/06* (2013.01); *B01J 8/085* (2013.01); *B01J 19/2465* (2013.01); *C08F 2/34* (2013.01);
(Continued)

(58) Field of Classification Search
CPC ........ C08F 2/34; B01J 8/44; B01J 8/28; B01J 19/24
See application file for complete search history.

(56) References Cited

U.S. PATENT DOCUMENTS 2,602,647 A 7/1952 Miller
3,254,070 A 5/1966 Roelen
(Continued)

FOREIGN PATENT DOCUMENTS

EP 0059080 A2 9/1982
EP 0089691 A2 9/1983
(Continued)

OTHER PUBLICATIONS

Harnieiec et al.;"Polymerization Reaction Engineering—Metallocene Catalysts", Prog. Polym. Sci., 1996, vol. 21, pp. 651-706.
(Continued)

*Primary Examiner* — Fred M Teskin
(74) *Attorney, Agent, or Firm* — Cantor Colburn LLP

(57) ABSTRACT

The invention relates to a multi-zone reactor for the continuous fluidized bed polymerization of one or more α-olefin monomers of which at least one is ethylene or propylene, which multi-zone reactor is operable in condensed mode, which multi-zone reactor comprises a first zone, a second zone, a third zone, a fourth zone and a distribution plate, (Continued)

wherein the second zone contains an inner wall, wherein the third zone contains an inner wall, wherein at least part of the inner wall of the third zone is either in the form of a gradually increasing inner diameter or a continuously opening cone, wherein the diameter or the opening increases in the vertical direction towards the top of the multi-zone reactor, wherein the largest diameter of the inner wall of the third zone is larger than the largest diameter of the inner wall of the second zone.

16 Claims, 3 Drawing Sheets

(51) Int. Cl.
  *B01J 8/28*  (2006.01)
  *B01J 8/44*  (2006.01)
  *B01J 19/24*  (2006.01)
  *C08F 10/02*  (2006.01)
  *B01J 8/08*  (2006.01)
  *C08F 210/16*  (2006.01)

(52) U.S. Cl.
  CPC ..... *C08F 10/02* (2013.01); *B01J 2208/00938* (2013.01); *B01J 2219/00033* (2013.01); *B01J 2219/185* (2013.01)

(56) References Cited

U.S. PATENT DOCUMENTS

| | | | |
|---|---|---|---|
| 3,298,792 A | | 1/1967 | Di Drusco |
| 4,518,750 A | | 5/1985 | Govoni et al. |
| 4,933,149 A | | 6/1990 | Rhee et al. |
| 5,143,705 A | | 9/1992 | Platz |
| 5,381,827 A | | 1/1995 | Koura et al. |
| 5,462,999 A | * | 10/1995 | Griffin ................... B01J 8/1809 526/348.2 |
| 5,627,243 A | | 5/1997 | Hamalainen et al. |
| 6,391,985 B1 | | 5/2002 | Goode et al. |
| 6,403,730 B1 | | 6/2002 | Mutsers |
| 6,441,108 B1 | | 8/2002 | Haendeler et al. |
| 6,472,483 B1 | | 10/2002 | Goode et al. |
| 6,759,489 B1 | | 7/2004 | Turkistani |
| 7,226,565 B2 | | 6/2007 | Knauer et al. |
| 8,354,483 B2 | | 1/2013 | Bergstra et al. |
| 2009/0062586 A1 | | 3/2009 | Hamba |
| 2010/0267915 A1 | | 10/2010 | Bergstra et al. |
| 2010/0273971 A1 | | 10/2010 | Bergstra et al. |
| 2011/0152489 A1 | * | 6/2011 | Dumas ................... B01J 8/1809 526/348 |
| 2016/0297899 A1 | | 10/2016 | Banat et al. |

FOREIGN PATENT DOCUMENTS

| | | |
|---|---|---|
| EP | 0095848 A2 | 12/1983 |
| EP | 1764378 A1 | 3/2007 |
| EP | 2495037 A1 | 9/2012 |
| WO | 0044792 A1 | 8/2000 |
| WO | 0069552 A1 | 11/2000 |
| WO | 0240146 A1 | 5/2002 |
| WO | 2007071527 A1 | 6/2007 |
| WO | 2011147539 A1 | 12/2011 |
| WO | 2015078814 A1 | 6/2015 |

OTHER PUBLICATIONS

International Search Report for International Application No. PCT/EP2014/075410; Date of Mailing: Jan. 29, 2015; 6 pages.
International Search Report for International Application No. PCT/EP2014/075411; Date of Mailing: Jan. 26, 2015; 6 pages.
International Search Report for International Application No. PCT/EP2014/075412; Date of Mailing: Jan. 26, 2015; 6 pages.
Peacock, "Handbook of Polyethyiene: Structures, Properties, and Applications", 2000, pp. 61-62.
Written Opinion of the International Seach Report for International Application No. PCT/EP2014/075410; Date of Mailing: Jan. 29, 2015; 12 pages.
Written Opinion of the International Search Report for International Application No. PCT/EP2014/075411; Date of Mailing: Jan. 26, 2015; 11 pages.
Written Opinion of the International Search Report for International Application No. PCT/EP2014/075412; Date of Mailing: Jan. 26, 2015; 5 pages.

* cited by examiner

MULTI-ZONE REACTOR FOR CONTINUOUS POLYMERIZATION OF ALPHA OLEFIN MONOMERS

CROSS REFERENCE TO RELATED APPLICATIONS

This application is a 371 of International Application No. PCT/EP2014/075412, filed Nov. 24, 2014, which claims priority to U.S. Application No. 61/929,597, filed Jan. 21, 2014, and European Application No. 13195141.0, filed Nov. 29, 2013, all of which are incorporated herein by reference in their entirety.

The invention relates to a multi-zone reactor suitable for continuous polymerization of α-olefin monomers, a process using said reactor, a system comprising said reactor, a process using said reactor, a process using said system, the polyolefins obtainable by said processes and to the use of the multi-zone reactor and to the use of the system.

There are many different processes for the polymerization of α-olefin monomers, including gas-phase fluidized bed processes, slurry loop or stirred tank reactors, suspension and solution processes.

The discovery of the process for the production of polyolefins in fluidized beds has provided a means for the production of a diverse array of polyolefins such as polyethylene, polypropylene, and polyolefin copolymers. Using a fluidized bed polymerization process substantially reduces the energy requirements as compared to other processes and most importantly reduces the capital investment required to run such a process to produce polymers.

Gas fluidized bed polymerization plants generally employ a continuous cycle. In one part of the cycle, in a reactor a cycling gas stream is heated by the heat of polymerization. This heat is removed in another part of the cycle by a cooling system external to the reactor.

However, the active, growing powder in a gas fluidized bed polyolefin reactor contains a wide range of particle sizes and many desired polyolefin products are difficult to produce in such gas fluidized bed reactors, such as bimodal products, multimodal products, products having broad molecular weight distributions, polyolefins based on comonomers that are normally liquids at elevated temperatures and pressures or other advanced products.

Furthermore, gas fluidized bed reactors include various limitations, for example they have a limited heat removal of the heat produced during the exothermic polymerization of the α-olefin monomers. If heat is not sufficiently removed, various undesired effects occur, such as degradation of the polymerization catalyst, degradation of polyolefin produced, agglomeration of the polyolefin and/or chunking of the polyolefin.

Consequently, the overall effect of a limitation in heat removal, is a limitation of the rate of production of the polyolefin.

Consequently, there have been many developments to increase heat removal.

For example, a more efficient way to achieve heat removal is by cooling the gaseous recycle stream to a temperature below its dew point, resulting in the condensation of at least part of the recycle stream to form a bottom recycle stream containing liquid and gas. The thus formed bottom recycle stream is then introduced into the fluidized bed polymerization reactor, where the liquid portion will vaporize upon exposure to the heat of the reactor, which vaporization will remove heat from the reactor. This mode of operation is known in the art as a "condensing mode" or "condensed mode" process.

However, the heat removal that can be achieved in such condensed mode is still limited, since the current reactors, systems and processes for the production of polyolefins using a fluidized bed and a condensed mode do not allow large amounts of liquid in the recycle stream as this causes destabilization of the fluidized bed.

For example, EP 89 691 A2 discloses a process for increasing polymer production in a fluidized bed reactor employing an exothermic polymerization reaction by cooling the recycle stream to below its dew point and returning the resultant two-phase fluid stream to the reactor to maintain the fluidized bed at a desired temperature above the dew point of the recycle stream. The inventors of EP 89 691 A2 found that the amount of condensation of liquid in the recycle stream could be maintained at up to about 20 percent by weight.

In order to increase the cooling capacity and therefore the production rate, it is therefore desirable to allow larger amounts of liquid in the recycle stream without causing destabilization of the fluidized bed.

Therefore, it is the object of the invention to provide a fluidized bed system suitable for the production of polyolefins and which is operable in condensed mode, which allows introduction of higher amounts of liquid without causing destabilization of the fluidized bed.

This object is achieved by a multi-zone reactor suitable for the continuous fluidized bed polymerization of one or more α-olefin monomers of which at least one is ethylene or propylene, which multi-zone reactor is operable in condensed mode, which multi-zone reactor comprises a first zone, a second zone, a third zone, a fourth zone and a distribution plate, wherein the first zone is separated from the second zone by the distribution plate, wherein the multi-zone reactor is extended in the vertical direction wherein the second zone of the multi-zone reactor is located above the first zone and wherein the third zone of the multi-zone reactor is located above the second zone, and wherein the fourth zone of the multi-zone reactor is located above the third zone wherein the second zone contains an inner wall, wherein at least part of the inner wall of the second zone is either in the form of a gradually increasing inner diameter or a continuously opening cone, wherein the diameter or the opening increases in the vertical direction towards the top of the multi-zone reactor wherein the third zone contains an inner wall, wherein at least part of the inner wall of the third zone is either in the form of a gradually increasing inner diameter or a continuously opening cone, wherein the diameter or the opening increases in the vertical direction towards the top of the multi-zone reactor wherein the largest diameter of the inner wall of the third zone is larger than the largest diameter of the inner wall of the second zone.

In some embodiments, the reactor of the invention may thereby preferably comprise at least a part of said second zone and/or said third zone contains an inner wall, wherein at least part of the inner wall has a cylindrical shape. The inner wall of the reactor may be the inner envelope delimiting the reactor.

In the context of the present invention, a gradually increasing diameter may for example mean an increase of the diameter of the inner wall of the reactor in the vertical direction towards the top of the reactor. Said increase may be for example stepwise, constant, logarithmic or exponential. One example of such is a continuously opening cone In the context of the present invention, a continuously opening cone may for example mean a conically shaped part of the inner wall of the reactor comprising a first circular opening and a second circular opening connected via the inner wall of the reactor, in which the derivative of the diameter variation of the wall as measured in the vertical direction towards the top of the reactor may preferably have a constant and positive value.

In some embodiments of the invention, the zone, preferably for example the second zone, in the area directly above the distribution plate is either in the form of a gradually increasing inner diameter or a continuously opening cone. In the context hereof, directly above may mean for example that a zone in the form of a gradually increasing inner diameter or a continuously opening cone, wherein the diameter or the opening increases in the vertical direction towards the top of the multi-zone reactor is located relative to the distribution plate, so that accumulation of liquids on the surface of the distribution plate may preferably be prevented.

In some embodiments, the second zone may contain an inner wall, wherein at least part of the inner wall of the second zone is either in the form of a gradually increasing inner diameter or a continuously opening cone, wherein the diameter or the opening increases in the vertical direction towards the top of the multi-zone reactor. This may lead to a variation of the superficial gas velocity at least in a part of the second zone, since superficial gas velocity depends on the circular cross-sectional surface inside of the reactor. This may allow to reduce superficial gas velocity in the vertical direction towards the top of the multi-zone reactor, so that the average residence time of polymer particles in the second zone can be increased as a result.

A third zone of the multi-zone reactor may be located above the second zone of the multi-zone reactor. In some embodiments, the third zone may contains an inner wall, wherein at least part of the inner wall of the third zone is either in the form of a gradually increasing inner diameter of a continuously opening cone, wherein the diameter or the opening increases in the vertical direction towards the top of the multi-zone reactor. This may lead to a variation of the superficial gas velocity at least in a part of the third zone, since superficial gas velocity depends on the circular cross-sectional surface inside of the reactor. This may allow to reduce superficial gas velocity in the vertical direction towards the top of the multi-zone reactor, so that the average residence time of polymer particles in the third zone can be increased as a result.

The multi-zone reactor of the invention is a single-unit reactor that is operable in a condensed mode having the advantage that the amount of liquid in the recycle stream may be much higher without causing destabilization of a fluidized bed comprised in the reactor. In other words, the fluidized bed in the multi-zone reactor may be operated at turbulent conditions with high amounts of liquids.

This means that the reactor may be operated at higher polyolefin production rates.

Furthermore, with the multi-zone reactor of the invention, polymer particles may be segregated by size: that is the larger particles may fall into the lower part of the reactor, whereas the smaller particles may be entrained by the fluids circulating through the reactor into the upper part of the reactor.

Also, when using the multi-zone reactor of the invention, the reactor may be operated using high rates of circulation of the fluid, which leads to a more uniform temperature within the reactor, for example within the second zone.

Also, when operating the reactor of the invention, a more uniform residence time may be achieved and hence the polyolefin produced may have a more uniform particle size distribution, especially for example by reducing the number of polymer particles with a very short residence time despite using a high fluid circulation rate.

Furthermore, due to the shape of the reactor of the invention, mixing patterns may be highly improved, thereby eliminating the presence of a stagnant zone and thus leading to an increase of the total utilized volume of the reactor.

Furthermore, the average particle size of the polyolefin produced in the multi-zone reactor of the invention may be larger. Also, the amount of fines in the polyolefin may be reduced.

Moreover, the operability and/or continuity of the multi-zone reactor of the invention may be improved.

Also, the reactor of the invention provides the possibility to perform a two-stage polymerization. For instance, in the second zone a gas-liquid polymerization may be performed and in the third zone a gas-phase polymerization may be performed. The top zone or fourth zone is a disengagement zone (gas expansion zone), designed so that the superficial gas velocity in that zone preferably hinders polymer particles to reach and/or stay in that zone. It has the function to disengage the reaction mixture and the polymer product of the reaction. Accordingly, this zone does not function as a reaction zone.

The design of the reactor of the invention differs from other multi-zone reactors suitable for the polymerization of one or more α-olefin monomers.

For example, U.S. Pat. No. 6,441,108 discloses a fluidized-bed reactor comprising a circular cross-section for the production of tacky polymers in the gas-phase, wherein the wall of the fluidized-bed reactor is in the form of a cylinder in its lower portion, and adjacent thereto, is in the form of a continuously opening cone, the angle of the cone, relative to the center line, is from 2 to 10°, and wherein the fluidized bed is higher than the cylinder.

For example, US2009/0062586 A1 discloses a gas-phase fluidized bed reactor, conducting reaction by feeding a gas through a gas-distribution plate located at the lower part of a reaction vessel, into a fluidized bed formed on the gas-distribution plate, the reaction vessel being made up so that the gas flow passage above the gas-distribution plate has a narrowed part at a specified position, and the fluidized bed being formed in the area from below to above the narrowed part.

The figures as used herein are meant to illustrate the invention but is by no means meant to limit the invention thereto.

Figure 1:
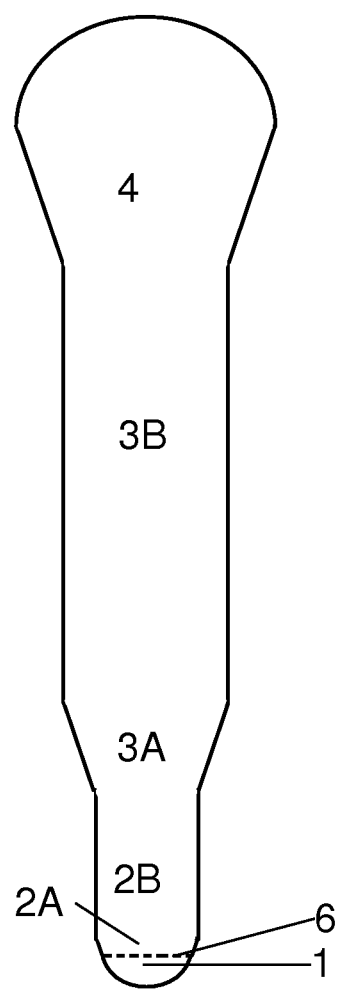
FIG. 1 schematically illustrates the vertical cross-section of the multi-zone reactor of the invention in one embodiment.

With 'multi-zone reactor suitable for the continuous polymerization of one or more α-olefin monomers of which at least one is ethylene or propylene' is meant a device capable of containing and controlling the polymerization of the one of more α-olefin monomers and which device can comprise a fluidized bed. The multi-zone reactor of the invention is preferably closed off at the top and the bottom by a hemisphere.

With 'fluidized bed' as used herein is meant that an amount of solid particles (in this case preferably the solid catalyst and/or the solid catalyst to which one or more α-olefin monomers of which at least one is ethylene or propylene is attached) in a solid/fluid mixture acts as a fluid. This can be achieved by placing the amount of solid particles under appropriate conditions, for instance by the introduction of fluid through the solid particles at a high enough velocity to suspend the solid particles and causing them to behave as a fluid.

With 'continuous polymerization of one or more α-olefins' or 'continuous preparation of polyolefin' is meant herein that one or more α-olefin monomers of which at least one is ethylene or propylene are fed to the multi-zone reactor and polyolefin thus produced is (semi)-continuously withdrawn through a polymer discharge system connected to the multi-zone reactor.

The system is suitable for the continuous polymerization of one or more α-olefin monomers of which at least one is ethylene or propylene. Preferred α-olefin monomers include for example α-olefins having from 4 to 8 carbon atoms. However, small quantities of α-olefin monomers having more than 8 carbon atoms, for example 9 to 18 carbon atoms, such as for example a conjugated diene, can be employed if desired. Thus it is possible to produce homopolymers of ethylene or propylene or copolymers of ethylene and/or propylene with one of more α-olefin monomers having from 4 to 8 α-olefin monomers. Preferred α-olefin monomers include but are not limited to but-1-ene, isobutene, pent-1-ene, hex-1-ene, hexadiene, isoprene, styrene, 4-methylpent-1-ene, oct-1-ene and butadiene. Examples of α-olefin monomers having more than 8 carbon atoms that can be copolymerized with an ethylene and/or propylene monomer, or that can be used as partial replacement for α-olefin monomers having from 4 to 8 α-olefin monomers include but are not limited to dec-1-ene and ethylidene norbornene.

When the system or process of the invention is used for the copolymerization of ethylene and/or propylene with α-olefin monomers, the ethylene and/or propylene preferably is used as the major component of the copolymer. For example, the amount of ethylene and/or propylene present in the copolymer is at least 65% by weight, for example at least 70% by weight, for example at least 80% by weight based on the total copolymer.

With 'condensed mode' is meant that a liquid containing stream is used to cool the multi-zone reactor (8).

The first zone (1) of the multi-zone reactor (8) is separated from the second zone (2) by a distribution plate (6), and is located below the second zone (2) of the multi-zone reactor (8).

In the first zone, a separation and distribution of the gas and liquid may take place, which is the primary function of the first zone. The first zone may further comprise a flow deflector associated with the entry conduit for providing the bottom recycle stream to prevent the accumulation of solids and liquids in the first zone. Such flow deflector is for example described in (the figures of) U.S. Pat. No. 4,933,149, hereby incorporated by reference.

The second zone contains an inner wall, wherein at least part of the inner wall of the second zone is either in the form of a gradually increasing inner diameter or a continuously opening cone, wherein the diameter or the opening increases in the vertical direction towards the top of the multi-zone reactor.

The continuously opening cone or gradually increasing inner diameter of the second zone is preferably located in the lower part of the second zone, more preferably is located directly above the distribution plate.

The second zone may comprise (part of) the fluidized bed where gas phase or gas-liquid polymerization may take place. The second zone (2) is suitable for gas-liquid polymerization (under turbulent fluidization conditions).

Turbulent fluidization conditions are described in U.S. Pat. No. 6,391,985, hereby incorporated by reference.

The third zone (3) of the multi-zone reactor (8) is located above the second zone (2) of the multi-zone reactor (8). The third zone contains an inner wall, wherein at least part of the inner wall of the third zone is either in the form of a gradually increasing inner diameter or of a continuously opening cone, wherein the diameter or the opening increases in the vertical direction towards the top of the multi-zone reactor.

Figure 2:
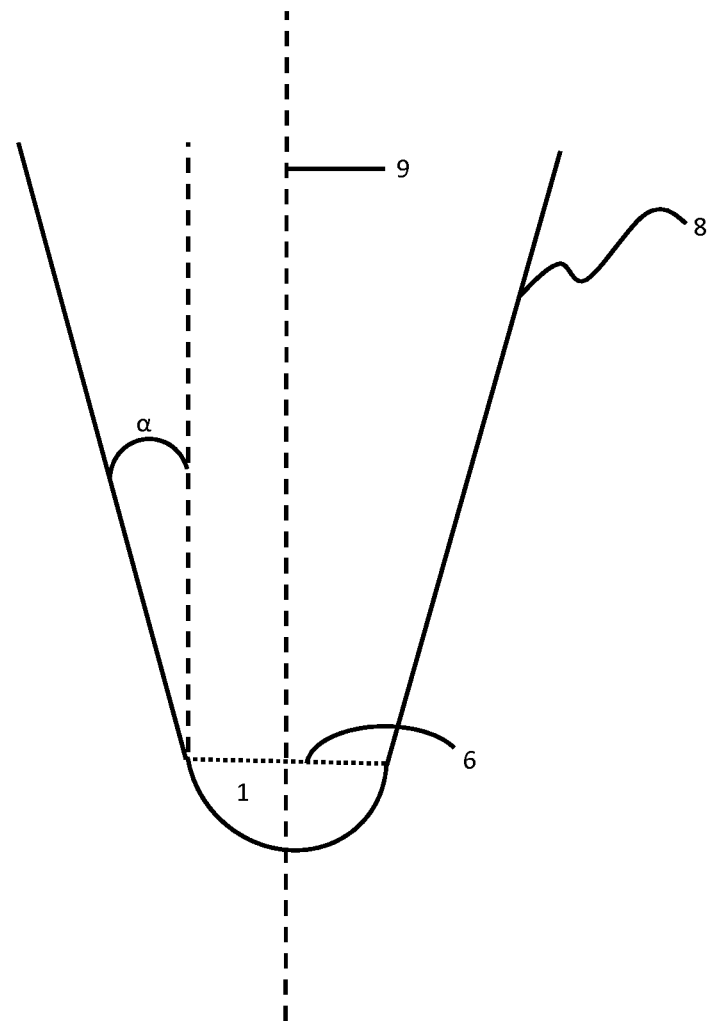
FIG. 2 schematically illustrates the vertical cross-section of the multi-zone reactor of the invention in another embodiment.

In case of a continuously opening cone or gradually increasing inner diameter, the shape of the third zone may be part of the shape of the second zone as illustrated by FIG. 2 herein. This may mean that both the second zone and the third zone may have a similar shape, namely that in the present case both the second zone and the third zone contain/have an inner wall in the form of a gradually increasing inner diameter or of a continuously opening cone, wherein the diameter or the opening increases in the vertical direction towards the top of the multi-zone reactor. For example, the continuously opening cone or gradually increasing inner diameter may extend from the second into the third zone and optionally also from the third into the fourth zone. However, the reactor may preferably comprise at least one part with an inner wall having a cylindrical shape, especially for example in the second zone and/or in the third zone and/or between the third and the top zone. In an embodiment, the inner wall of the third zone may have the same inclination as the inner wall of the second zone.

The inner wall of the third zone may have a different inclination as the inner wall of the second zone. The third zone comprises an inner wall, wherein at least part of the inner wall of the third zone is either in the form of a gradually increasing inner diameter or of a continuously opening cone, wherein the diameter or the opening increases in the vertical direction towards the top of the multi-zone, whereby said part of the inner wall may be located in any part of the third zone, for example in the lower or in the upper part of the third zone, but is preferably located in the lower part of the third zone in the vertical direction toward the top of the reactor.

The multi-zone reactor in this embodiment of the invention is schematically illustrated in FIG. 2 (FIG. 2).

The third zone may comprise part of the fluidized bed. The third zone (3) is suitable for gas-phase polymerization.

The third zone (3) and the second zone (2) can be distinguished when the multi-zone reactor (8) is operated; however there is no sharp boundary between the second and third zone. Typically, when operating the multi-zone reactor, the second zone will comprise more liquid than the third zone and in the third zone, a gas-phase polymerization will take place.

The top zone of the multi-zone reactor, which is for example the fourth zone of the multi-zone reactor is located above the third zone. The top zone or fourth zone is not intended for gas-phase polymerization, but instead is suitable for gas expansion. It has the function to disengage the reaction mixture and the polymer product of the reaction. Accordingly, this zone does not function as a reaction zone. The superficial gas velocity may be of such low value that polymer particles preferably do not enter into the top zone, preferably at least so that the top recycle stream is sufficiently free of particles for example to avoid clogging to occur in the compressor.

In such multi-zone reactor, during the course of polymerization, fresh polymer particles are produced by catalytic polymerization of α-olefin monomers. Such polymer particles are projected upwards in the direction of the fourth zone through the circulating gas.

Most of these particles do preferably not reach the fourth zone or return to the second or third zone by gravity as the superficial gas velocity decreases in the fourth zone. The fourth zone may be connected to the third zone or optional further zone(s).

The multi-zone reactor (8) of the invention may comprise further zones, such as for example one, two or even optionally three further zones, that can for example be a fifth zone and optionally a sixth zone and optionally even a seventh zone. These zones may provide a further possibility for polymerization, wherein each further zone may be operated at different reaction conditions. These further zones can be located preferably between the third zone and the top zone.

With inner diameter is meant the diameter in a given horizontal plane perpendicular to the center line (9) of the multi-zone reactor (8) as measured from the inside of the inner wall of the multi-zone reactor (8).

For example, the maximum inner diameter of the fourth zone is at least 1, for example at least 3, for example at least 5% and/or for example at most 300%, for example at most 200%, for example at most 150%, for example at most 80%, for example at most 70%, for example at most 60%, for example at most 50%, for example at most 40%, for example at most 30%, for example at most 25%, for example at most 20%, for example at most 15% larger than the maximum inner diameter of the third zone. For example, the maximum inner diameter of the fourth zone is from 5 to 30% larger than the maximum inner diameter of the third zone.

For example, the maximum inner diameter of the third zone is at least 1, for example at least 3, for example at least 5% and/or for example at most 300%, for example at most 200%, for example at most 150%, for example at most 80%, for example at most 70%, for example at most 60%, for example at most 50%, for example at most 40%, for example at most 30%, for example at most 25%, for example at most 20%, for example at most 15% larger than the maximum inner diameter of the second zone. For example, the maximum inner diameter of the third zone is from 15 to 30% larger than the maximum inner diameter of the second zone.

For example, the maximum inner diameter of the second zone is at least 1, for example at least 3, for example at least 5% and/or for example at most 300%, for example at most 200%, for example at most 150%, for example at most 80%, for example at most 70%, for example at most 60%, for example at most 50%, for example at most 40%, for example at most 30%, for example at most 25%, for example at most 20%, for example at most 15% larger than the maximum inner diameter of the first zone. For example, the maximum inner diameter of the second zone is from 15 to 30% larger than the maximum inner diameter of the first zone.

Figure 3:
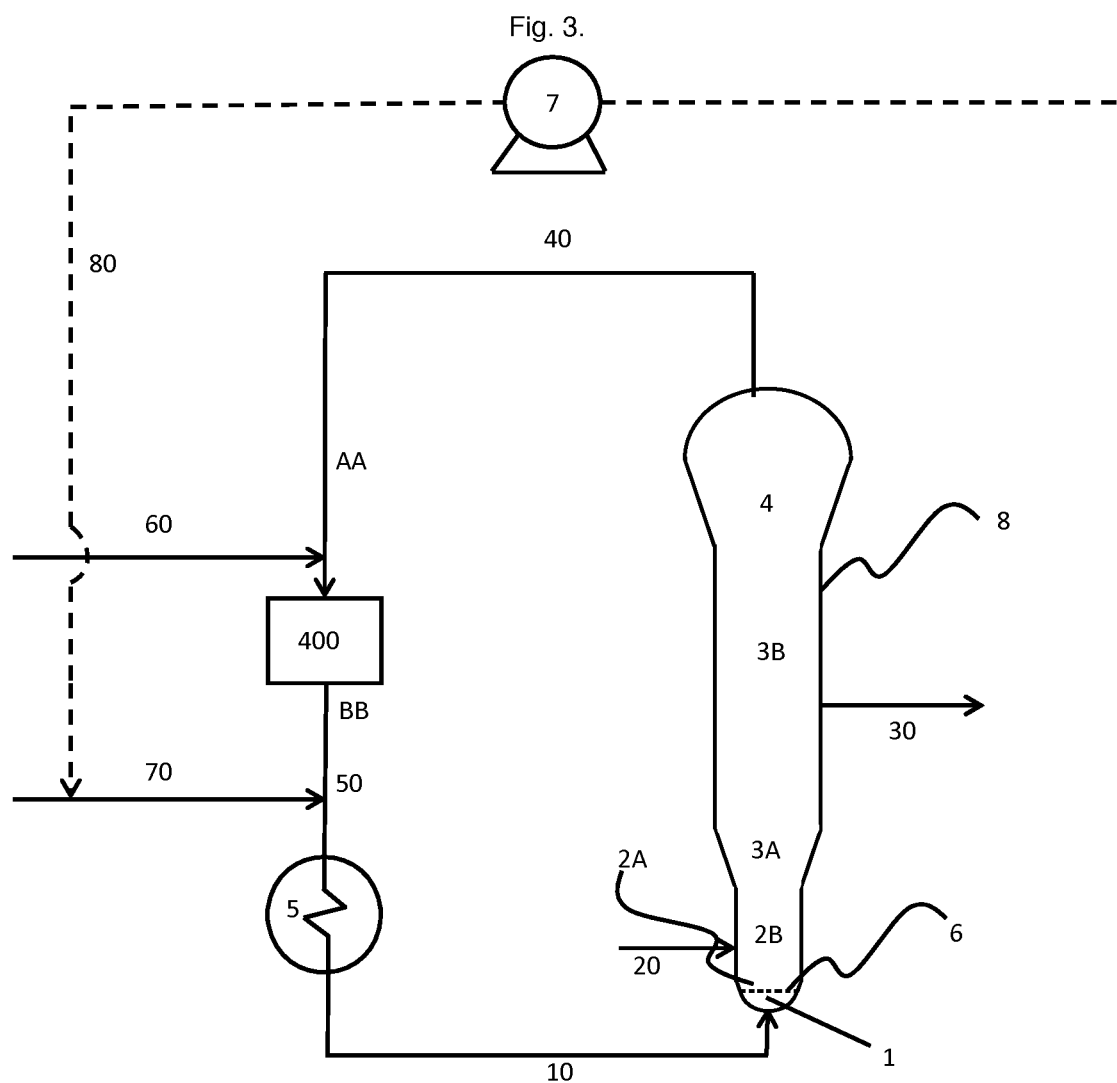
FIG. 3 schematically illustrates the system of the invention.

The distribution plate (6) may be any device that is suitable for distributing the bottom recycle stream in the multi-zone reactor (8) to keep a fluidized bed in the second zone (2) of the multi-zone reactor (8) and to serve as a support for a quiescent bed of the solid polymerization catalyst and polyolefin when the multi-zone reactor (8) is not in operation. For example, the distribution plate may be a screen, slotted plate, perforated plate, a plate of the bubble-cap type, or other conventional or commercially available plate or other fluid distribution device. An example of a commonly used type of distribution plate is a perforated plate with some above-hole structure on top of each hole, to prevent particle sifting. In FIGS. 1, 2 and 3, the distribution plate (6) is indicated with a dotted line.

The distribution plate is generally positioned perpendicular to the longitudinal axis of a reactor, wherein the fluidized bed is located above said distribution plate and a mixing chamber region (zone 1) below said distribution plate.

The distribution plate is used for achieving good gas distribution. It may be a screen, slotted plate, perforated plate, a plate of the bubble-cap type, or the like. The elements of the plate may all be stationary or the plate may be of the mobile type disclosed in U.S. Pat. No. 3,298,792. Mechanically swept distribution grids are described in U.S. Pat. No. 3,254,070. Whatever its design, it must diffuse the recycle fluid through the particles at the base of the bed to keep the bed in a fluidized condition and also serve to support a quiescent bed of resin particles when the reactor is not in operation.

For purpose of this invention, the preferred type distribution plate is generally of the type which is fabricated from metal and which has holes distributed across its surface. The holes are normally of a diameter of about one-half inch. The holes extend through the plate and over the holes there are positioned angle caps which are fixedly mounted to the plate. Alternate rows of angle irons are oriented at angles to each other, preferably at 60 degrees, in alternate parallel alignment as shown in FIG. 4 of U.S. Pat. No. 4,933,149. They serve to distribute the flow of fluid along the surface of the plate so as to avoid stagnant zones of solids. In addition, they prevent resin particles from falling through the holes when the bed is settled or quiescent.

The distribution plate may for example have the shape of a cone, as for example described in U.S. Pat. No. 2,602,647A1, hereby incorporated by reference, which describes a conical distribution plate having a ported central conical section and a ported outer annular conical section, the ports in said central conical section and said annular conical section being circumferentially offset so as to provide a substantial deflecting surface on said central section extending to the ports in the annular section.

Other conical shapes of the distribution plate are for example described in U.S. Pat. No. 4,518,750, hereby incorporated by reference, which describes a distributor of fluidization gases which comprises a double cone body consisting of: (a) a lower conical element, arranged with the vertex turned downwards, provided with more than two ribs on the lateral surface, said ribs having such a profile as to form, together with the wall of the containing shell, flow channels with a decreasing cross-section in an upward direction so that the velocity of the gas will increase gradually and correspondingly, the ribs being arranged diametrically opposite to each other with an axial symmetry and with an inclination with respect to the vertical such as to impart to the inflowing gas current a tangential component, the profile and inclination of the ribs being such as to allow the passage of the solid particles entrained by the inflowing gas, and so as to hinder the falling back of the particles of the fluidized bed whenever the feeding in of the gas is interrupted; and of (b) an upper conical element, with its vertex turned upwards, superimposed onto the lower conical element and having the function of activating the circulation of the solid in the fluidized bed, eliminating the dead or stagnation zones, said process being further characterized in that the distributor in the fluid bed reactor in which it is carried out comprises devices for recycling of the gas, which distributor and the recycling devices allow the passage of the solid particles of the fluidized material entrained by the recycling gas.

For example, U.S. Pat. No. 5,143,705, hereby incorporated by reference, describes a conical distribution plate with its apex pointing upwardly, wherein said conical distribution plate has a plurality of openings.

The distribution plate in the multi-zone reactor of the invention may for example have the shape of a cone, for example with its apex pointing towards the top of the reactor.

For example, U.S. Pat. No. 7,226,565B2, hereby incorporated by reference, discloses a distribution plate having a plurality of gas flow orifices whose outlet sides are sidened conically, said outlet sides being wider than the inlet sides.

For example U.S. Pat. No. 5,627,243, hereby incorporated by reference, discloses a cap-like low control elements formed by a cone with a surface of revolution having its tip pointed upward. The conical surface of the flow control element is provided with preformation which is arranged substantially evenly divided on all side surfaces of the element.

For example, U.S. Pat. No. 5,381,827 discloses a gas distributor for use in a gas phase polymerization apparatus having an agitator in a fluidized bed polymerization reactor, the gas distributor being characterized in that the distributor has holes each covered with a cap from above, the cap having an opening oriented in a substantially horizontal direction at an angle of about 90 to 135° with, and outwardly of, a tangent to a circle centered about the center of the reactor.

In addition to the distribution plate (6), the multi-zone reactor (8) may be further equipped with other means for agitation, such as mechanical agitation, for example a stirrer. Preferably, the multi-zone reactor does not comprise mechanical agitation.

In one embodiment, the invention relates to the reactor of the invention, wherein at least the bottom part of the third zone (3) comprises an inner wall in the form of a gradually increasing inner diameter or a continuously opening cone, wherein the diameter or the opening increases in the vertical direction towards the top of the multi-zone reactor. In this embodiment, the bottom part of the second zone (2) and/or of the bottom part of the fourth zone (4) may also comprise an inner wall in the form of a gradually increasing inner diameter or a continuously opening cone, wherein the diameter or the opening increases in the vertical direction towards the top of the multi-zone reactor.

In one embodiment, the invention relates to the reactor of the invention, wherein zone (2) in the area directly above the distribution plate is either in the form of a gradually increasing inner diameter or a continuously opening cone (2A), wherein the diameter or the opening increases in the vertical direction towards the top of the multi-zone reactor and wherein the top part of the second zone has an inner wall having a cylindrical shape (2B) and wherein the top part of the second zone is connected to a bottom part of the third zone (3A), wherein the bottom part of the third zone is either in the form of a gradually increasing inner diameter or a continuously opening cone, wherein the diameter or the opening increases in the vertical direction towards the top of the multi-zone reactor and wherein the top part of the third zone has an inner wall having a cylindrical shape (3B) and wherein the top part of the third zone is connected to the top zone, for example to the fourth zone.

In one embodiment, the invention relates to the reactor of the invention, wherein zone (2) in the area directly above the distribution plate is either in the form of a gradually increasing inner diameter or a continuously opening cone (2A), wherein the diameter or the opening increases in the vertical direction towards the top of the multi-zone reactor and wherein the top part of the second zone has an inner wall having a cylindrical shape (2B).

In one embodiment, the invention relates to the reactor of the invention, wherein the top part of the second zone is connected to a bottom part of the third zone (3A), wherein the bottom part of the third zone is either in the form of a gradually increasing inner diameter or a continuously opening cone, wherein the diameter or the opening increases in the vertical direction towards the top of the multi-zone reactor and wherein the top part of the third zone has an inner wall having a cylindrical shape (3B) and wherein the top part of the third zone is connected to the top zone, for example to the fourth zone.

Preferably, the cylindrical shape is the shape of a right circular cylinder.

The multi-zone reactor (8) in this embodiment of the invention is schematically illustrated in FIG. 1 (FIG. 1).

Preferably, the invention relates to a reactor of the invention, wherein the angle ($\alpha$) of the inner wall of the part of the second zone having the gradually increasing inner diameter or having the continuously opening cone, relative to the centre line (9) of the multi-zone reactor (8) is from 1 to 40 degrees.

For example, said angle ($\alpha$) is at least 5, for example at least 7, for example at least 10 degrees, for example at least 20 degrees and/or for example at most 60, for example at most 50, for example at most 40. For example, the angle ($\alpha$) is in the range from 10 to 40 degrees.

Preferably, the invention relates to a reactor of the invention, wherein the angle ($\alpha$) of the inner wall of the part of the third zone having the gradually increasing inner diameter or having the continuously opening cone, relative to the centre line (9) of the multi-zone reactor (8) is from 1 to 40 degrees.

For example, said angle ($\alpha$) is at least 5, for example at least 7, for example at least 10 degrees, for example at least 20 degrees and/or for example at most 60, for example at most 50, for example at most 40. For example, the angle ($\alpha$) is in the range from 10 to 40 degrees.

In another aspect, the invention relates to a process for the continuous preparation of a polyolefin in the multi-zone reactor of the invention from one or more $\alpha$-olefin monomers of which at least one is ethylene or propylene comprising feeding a solid polymerization catalyst to the multi-zone reactor (8) in the area above the distribution plate (6)

feeding the one or more $\alpha$-olefin monomers to the multi-zone reactor (8)

withdrawing the polyolefin (30) from the multi-zone reactor (8)

circulating fluids from the top of the multi-zone reactor (8), for example the top of the fourth zone (4) in case the multi-zone reactor consists of four zones, to the first zone wherein the fluids are cooled to below their dew point, resulting in a bottom recycle stream, and wherein the bottom recycle stream is introduced into the first zone wherein the rate of superficial gas velocity is in the range of 0.5 to 5 m/s.

It should be appreciated by the skilled person that due to the fact that the volume in the multi-zone reactor of the invention expands from the first zone to the second zone and from the second zone to the third zone and from the third zone to the fourth zone when operating the multi-zone reactor, the superficial gas velocities in these zones will decrease from the first to the second and from the second to the third zone and from the third zone to the fourth zone. For example, the superficial gas velocities in the multi-zone reactor of the invention, for example when used to produce polyethylene, for example LLDPE, may be in the range of from 0.7 to 3.5 m/s, which may then be reduced to 0.5 to 2 m/s in the third zone, after which the superficial gas velocity may be further reduced in the top zone.

In one embodiment of the invention, the second zone is divided into two or more subzones by one or more substantially vertical partition walls, for example a tube, extending from a point located above the distribution plate to a point located below the fourth zone, preferably such that a dead zone is prevented.

With 'dead zone' is meant a region where the mixing is insufficient for providing homogeneous reaction resulting in either chunking or melting in the dead zone and/or resin that is outside the desired specifications (off spec). Examples of specifications are desired density, molecular weight, molecular weight distribution and/or melt flow rate.

Such vertical partition walls are sometimes also referred to as 'draft tube'. This is for example described in WO02/40146A1 and in U.S. Pat. No. 6,403,730, both of which are hereby incorporated by reference.

In one embodiment, the multi-zone reactor further comprises a moving bed unit, wherein the moving bed unit is provided with an inlet and an outlet which are connected to the the second zone, wherein in said zone shielding means are positioned such that via the outlet of the moving bed unit inflow of gas from said zone is inhibited and outflow of polymerization particles is allowed, wherein preferably the moving bed unit is provided with gas feed means for feeding gas at one or more different levels in the moving bed unit and/or wherein preferably the outlet of the moving bed unit is provided with means for displacing metered quantities of polymer particles from the moving bed unit into the zone above the distribution plate.

US 20100273971, which is hereby incorporated by reference, discloses such moving bed unit (also known as 'draught tube'), wherein the moving bed unit is provided with an inlet and an outlet which are connected to the second zone of the reactor, wherein in the second zone is positioned shielding means such that via the outlet of the moving bed unit inflow of gas from the second zone is inhibited and outflow of polymerization particles is allowed.

Such draught tube is also described in U.S. Pat. No. 8,354,483, hereby incorporated by reference, which discloses that the moving bed unit is provided with gas feed means for feeding gas at one or more different levels in the moving bed unit and preferably wherein the outlet of the moving bed unit is provided with means for displacing metered quantities of polymer particles from the moving bed unit into the second zone.

The solid polymerization catalyst may be fed to the multi-zone reactor (8) for example by using feeding means, such as a pump. The solid polymerization catalyst may for example be fed as a suspension in a solvent, for example a hydrocarbon solvent or the like, or in an inert gas, such as nitrogen or may be included in another feed to the multi-zone reactor (8), for example in the feed (60) or in the feed (70). The solid polymerization catalyst may also be injected into the second zone (2) as a dry catalyst.

The solid polymerization catalyst may be fed at any position in the area above the distribution plate or at a combination of positions, but preferably it is fed to the second zone (2), preferably to the bottom part of the second zone (2).

Likewise, withdrawal of the polyolefin (30) may be done at any position in the area above the distribution plate or at a combination of positions, for example the polyolefin may be withdrawn from the bottom part of the second zone (2), the top part of the second zone (2), the bottom part of the third zone (3) and/or the top part of the third zone (3). Preferably, the polyolefin is withdrawn from the bottom part of the second zone (2) and/or from the bottom part of the third zone (3).

The person skilled in the art is aware of which solid polymerization catalysts are suitable for continuous polymerization of α-olefin monomers.

For example, heterogeneous polymerization catalysts, which are catalysts that are supported on an inert substrate, for example silica or alumina may be used. Suitable examples of hetereogeneous catalysts include supported Ziegler Natta and supported metallocene catalysts and combinations thereof, for example in a mixed catalyst system. Examples of a catalyst composition for polymerization of α-olefins comprising at least two catalytic components are for example described in EP1764378A1, hereby incorporated by reference. EP1764378A1 discloses a catalyst composition comprising a metallocene component and a Ziegler-Natta type transition metal component, at least one activator and support material. Metallocene catalysts are for example described by Hamielec and Soares in "Polymerisation reaction engineering-metallocene catalysts" (Prog. Pol. Sci. Vol. 21, 651-706, 1996), hereby incorporated by reference. The solid polymerization catalyst may also be a metal oxide catalyst, for example a chromium oxide catalysts. Such metal oxide catalyst may for example be based on a support of an inert substrate, for example on silica, alumina silicate or alumina, for example on a highly porous support of silica, alumina silicate or alumina as for example disclosed in the "Handbook of Polyethylene" by Andrew Peacock at pages 61-62, hereby incorporated by reference.

The group of metallocene catalysts includes many variations. In the most general form, metallocene catalysts comprise a metal atom, for example titanium, zirconium or hafnium attached to for example four ligands, for example two substituted cyclopentadienyl ligands and two alkyl, halide or other ligands with an optionally modified organo-alumoxane as activator, for example methylaluminoxane (MAO) or a compound based on boron. Examples of inert substrates that can be used as support for a metallocene catalyst include inorganic oxides, for example $SiO_2$, $MgCl_2$, $Al_2O_3$, $MgF_2$ and $CaF_2$. Preferably, the solid polymerization catalyst used in the system and process of the invention is a metallocene catalyst supported on silica, for example a silica as commercially available, for example Grace Davison 948 silica or Ineos ES 70 silica.

A Ziegler Natta catalyst may be used together with a cocatalyst in the system and process of the invention. Suitable example of cocatalysts include but are not limited to organo aluminium compounds having formula $AlR_3$, wherein R stands for a hydrocarbon having 1 to 10 C-atoms. Examples of organo aluminium compounds having formula $AlR_3$ include triethylaluminium alkyl, triisobutyl aluminium trialkyl, tri-n-hexyl aluminium and tri octyl aluminium.

Examples of inert substrates that can be used as support for a Ziegler Natta catalyst include inorganic oxides, for example oxides of silica, alumina, magnesium, titanium and/or zirconium; magnesium chloride, clays, zeolites, polystyrene, polyethylene, polypropylene, graphite and/or layered silicates.

It will be clear to the person skilled in the art, that also mixtures of solid polymerization catalysts may be used in the invention.

The one or more α-olefin monomers may be fed to the multi-zone reactor (8) using feeding means such as a pump. The monomers are preferably fed to the multi-zone reactor (8) by adding the monomers to the fluids that are circulated from the top of the multi-zone reactor to the first zone prior to cooling of the fluids. Preferably, the one or more α-olefin monomers are added in such amounts that they make up for the one or more α-olefin monomer consumed during the polymerization.

The one or more α-olefin monomers may be fed in one or in multiple feeding streams. For example, one type of olefin monomer, typically ethylene and/or propylene may be comprised in the feed (60) and another type of α-olefin monomer, also referred to herein as the comonomer, may be comprised in the feed (70).

Polyolefin (30) may be withdrawn from the multi-zone reactor (8) using any suitable means, for example a polymer discharge system. The polyolefin may be used as such or may be subjected to purification or other end-processing.

For the avoidance of doubt the term 'fluids' encompasses liquids, gases and mixtures thereof, wherein the term 'liquids' includes liquids containing solid particles, such as slurries.

The fluids may be cooled to below the dew point of the fluids using any suitable cooling means. For example, cooling of the fluids may be performed using a cooling unit.

The dew point may be increased by increasing the operating pressure of the fluids and/or by increasing the percentage of condensable fluids and simultaneously decreasing the percentage of non-condensable gases in the fluids.

In order to maintain a fluidized bed in the process of the invention, the superficial gas velocity is in the range of 0.5 to 5 m/s. For example, is at least 1, for example at least 1.5, for example at least 2 and/or for example at most 4.5, for example at most 4, for example at most 3.5, for example at most 3 m/s.

By feeding the fluids that are cooled to below the dew point of the fluids into the first zone, the fluids will be passed from the first zone through the distribution plate (6) into the second zone (2), resulting in the formation of a fluidized bed and/or a bubble column. Heat generated by the polymerization will cause the liquids in the fluids to evaporate. The feeding of the solid polymerization catalyst and the one or more α-olefin monomers to the multi-zone reactor (8) will result in the formation of polyolefin (30), which is withdrawn from the multi-zone reactor (8). The top recycle stream is recirculated from the top of the multi-zone reactor to the first zone. The one or more α-olefin monomers and other fluids, such as hydrogen, an inert gas or liquid, for example a condensable inert component, may be added to the top recycle stream to make up for reacted fluids before cooling the fluids to below the dew point of the fluids to form a bottom recycle stream.

By using the multi-zone reactor of the invention, in the second zone (2) a gas-liquid polymerization may take place and in the third zone, a gas-phase polymerization may then occur. Therefore, the invention may provide a two-stage polymerization.

In another aspect, the invention relates to a system suitable for continuous polymerization of one or more α-olefin monomers of which at least one is ethylene or propylene comprising the multi-zone reactor (8) of the invention.

A special embodiment of this system is schematically represented in FIG. 3 (FIG. 3) without however being limited thereto. The system of FIG. 3 is only one of numerous possible schematic arrangements. Thus, for example, the sequence of the equipment items in the circulated gas line, particularly of the cooler and compressor can also be reversed or further equipment items can be integrated into the line. Further elements such as systems for discharging the product and for metering-in the catalyst are not shown in FIG. 3, such elements are known to those skilled in the art and can be integrated into the reactor in a known manner.

FIG. 3. illustrates a system suitable for continuous polymerization of one or more α-olefin monomers of which at least one is ethylene or propylene comprising the multi-zone reactor (8) of the invention, a compressor (400) and a cooling unit (5), wherein the first zone comprises a first inlet for receiving a bottom recycle stream (10)

wherein the second zone (2) comprises a first inlet for receiving a solid polymerization catalyst (20)

wherein the second zone (2) and/or the third zone (3) comprises a first outlet for providing polyolefin (30)

wherein the fourth zone (4) comprises a first outlet for a top recycle stream (40)

wherein the first outlet for the top recycle stream (40) of the fourth zone is connected to a first inlet of the compressor (400) via a first connection means (AA), for instance pipes wherein the compressor (400) comprises a first outlet for compressed fluids (50)

wherein the first outlet of the compressor (400) is connected to a first inlet for compressed fluids of the cooling unit (5) via a second connection means (BB)

wherein optionally the second connection means (BB), for instance pipes, comprises a first inlet for receiving a feed (70), wherein the cooling unit (5) comprises a first outlet for providing the bottom recycle stream (10) which first outlet of the cooling unit (5) is connected to the first inlet of the first zone wherein the first connection means (AA) comprises a first inlet for receiving a feed (60).

The system of the invention may further comprise a polymer withdrawal system, a polymer degassing system and a vent gas recovery system (not shown in FIG. 3). The outlet for the recovered components (in liquid form) (80) from the vent gas recovery system may be connected to the first inlet (70) of the second connection means (BB)

This system can suitably be used for a process for continuous polymerization of one or more α-olefin monomers of which at least one is ethylene or propylene in the system of the invention comprising supplying the second zone (2) with a solid polymerization catalyst using the first inlet for receiving the solid polymerization catalyst (20)

supplying a feed (60) comprising an α-olefin monomer to the first connection means (AA)

withdrawing the polyolefin (30) using the first outlet of the second zone (2) and/or the third zone (3) and circulating fluids from the first outlet of the fourth zone (4) to the first inlet of the first zone wherein the fluids are circulated by compressing the feed (60) and the top recycle stream (40) using the compressor (400) to form the compressed fluids (50)

subsequently cooling the compressed fluids (50) using the cooling unit (5) to below the dew point of the compressed fluids to form the bottom recycle stream (10) and feeding the bottom recycle stream (10) to the first zone of the multi-zone reactor (8) via the inlet for receiving the bottom recycle stream of the first zone, and wherein the superficial gas velocity in this process is in the range of 0.5 to 5 m/s.

In one embodiment of the invention, a gas-liquid polymerization is conducted in the second zone and a gas phase polymerization is conducted in the third zone.

The feed (60) comprises a chain transfer agent, for example hydrogen and may further comprise gaseous α-olefin monomers and insert gaseous components, for example nitrogen.

The feed (70) comprises condensable inert components, for example a condensable inert component selected from the group of alkanes having 4 to 20 carbon atoms, preferably 4 to 8 carbon atoms, and mixtures thereof, for example propane, n-butane, isobutene, n-pentane, isopentane, neopentane, n-hexane, isohexane or other saturated hydrocarbons having 6 C-atoms, n-heptane, n-octane and other saturated hydrocarbons having 7 or 8 C-atoms and any mixtures thereof; and may further comprise condensable α-olefin monomers, α-olefin comonomers and/or mixtures thereof.

The condensable inert component is preferably selected from the group of isopentane, n-hexane, n-butane, i-butane and mixtures thereof. Because of their more attractive pricing, preferably isopentane and/or n-hexane are/is used as condensable inert component(s) in the feed (70)

When copolymers are produced, the process of the invention further comprises supplying a comonomer using feed (60) or (70) in case of a non-condensable comonomer and using feed (70) in case of a condensable comonomer.

The bottom recycle stream comprises a fluid stream comprised of gas and liquid.

Preferably in the processes of the invention, the fluids are cooled to such extent that the amount of liquid in the bottom recycle stream (10) is at least 7% by weight, for example at least 9%, for example at least 14% by weight based on the total amount of liquid and gas. For example, the amount of liquid in the bottom recycle stream is at least 14.5%, for example at least 20%, for example at least 25% and/or for example at most 95%, for example at most 90%, for example at most 90%, for example at most 85%, for example at most 80%, for example at most 75%, for example at most 70%, for example at most 65%, for example at most 60%, for example at most 55%, for example at most 55% by weight based on the total amount of liquid and gas in the bottom recycle stream. Preferably, the amount of liquid in the bottom recycle stream is at least 25% and for example at most 55% by weight based on the total amount of liquid and gas in said bottom recycle stream.

High amounts of liquid in the bottom recycle stream enables feeding of one or more very high activity catalyst system.

The compressor (400) may be any device that is suitable for compressing the feed (60) and the top recycle stream (40) using the compressor (400) to form the compressed fluids (50). By compressing the feed (60) and the top recycle stream (40), the pressure of the compressed fluids (50) is increased compared to the feed (60) and the top recycle stream (40) before use of the compressor (400).

The cooling unit (5) may be any device that is suitable for cooling the compressed fluids (50) to below the dew point of the compressed fluids to form the bottom recycle stream (10). For example, a heat exchanger may be used as the cooling unit (5).

The top recycle stream (40) contains fluids that are withdrawn from the first outlet of the fourth zone (4) or in case of more than four zones, from the first outlet of the top zone of the multi-zone reactor (8).

The first connection means (AA) and the second connection means (BB) can in principle be any means for connecting the first outlet of the fourth zone (4) and the first inlet of the compressor (400) respectively, the first outlet of the compressor (400) and the first inlet of the cooling unit (5).

Hydrogen may for instance be used as a chain transfer agent to adjust the molecular weight of the polyolefin (30) produced.

The continuous polymerization of one or more α-olefin monomers will produce polyolefins in the form of particles, herein also referred to as 'polyolefin' (30). Examples of polyolefins which may thus produced, include a wide variety of polymers, for example polyethylene, for example linear low density polyethylene (LLDPE), which may for example be prepared from ethylene and but-1-ene, 4-methylpent-1-ene or hex-1-ene, high density polyethylene (HDPE), which may for example be prepared from ethylene or from ethylene with a small portion of an α-olefin monomer having from 4 to 8 carbon atoms, for example but-1-ene, pent-1-ene, hex-1-ene or 4-methylpent-1-ene. Other examples include but are not limited to plastomers, elastomers, medium density polyethylene, polypropylene homopolymers and polypropylene copolymers, including random copolymers, and block or multi-block copolymer and ethylene propylene rubber (EPR).

Preferably, in the process of the invention, the polyolefin produced is a polyethylene, more preferably a linear low density polyethylene.

Depending on their composition, the polyolefins obtained or obtainable by the process of the invention may have several advantages over the polyolefins produced in a reactor different from the reactor of the invention. For example, the impact of polypropylene impact copolymers may be increased, the amount of carbon black in ethylene polymer rubbers (EPR) may be decreased, the molecular weight distribution of polyethylene may be broadened, the homogeneity of the polyolefin may be increased, the residence time distribution may be narrower, the blockiness may be altered, the morphology may be changed, the bulk density may be changed etc.

Therefore, in another aspect, the invention relates to a polyolefin obtained or obtainable by the processes of the invention.

The processes of the invention are preferably conducted in an environment that is substantially free of water, oxygen and carbon dioxide, since the presence of water may negatively influence the activity of the solid polymerization catalyst.

Depending on which polyolefin is to be produced, the optimal reaction conditions can easily be determined by the person skilled in the art.

For example, generally, the temperature in the second zone (2) is preferably in the range from 0 to 130° C., for example from 20 to 110° C.

For example, generally, the temperature in the third zone (3) is preferably in the range from 20 to 130° C.

For example, the pressure in the multi-zone reactor (8) is preferably in the range from 0.1 to 10 MPa, for example in the range of 0.2 to 8 MPa.

In another aspect, the invention relates to the use of the multi-zone reactor of the invention for continuous polymerization of one or more α-olefin monomers of which at least one is ethylene or propylene.

In another aspect, the invention relates to the use of the system of the invention for continuous polymerization of one or more α-olefin monomers of which at least one is ethylene or propylene.

It is further noted that the term 'comprising' does not exclude the presence of other elements. However, it is also to be understood that a description on a product comprising certain components also discloses a product consisting of these components. Similarly, it is also to be understood that a description on a process comprising certain steps also discloses a process consisting of these steps.

The invention will now be elucidated by way of the following examples, without however being limited thereto.

EXAMPLES

A computer-based mathematical model capable of generating mass and heat balances along a fluidized bed reactor was used to run simulation in dry and condensed mode operation. Firstly, the model was run using actual data from commercial polyethylene production to validate the model. The results are shown in Table 1.

TABLE 1

Comparison of simulation results to commercial data for the production of polyethylene

| | Example Number | |
|---|---|---|
| Reactor Conditions | (Commercial) | (Model Results) |
| Internal Reactor diameter (m) | 4.42 | 4.42 |
| Recycle Gas Superficial Velocity (m/s) | 0.74 | 0.74 |
| Recycle Gas Composition (mole fraction): | | |
| Ethylene | 0.3370 | 0.3370 |
| Ethane | 0.0150 | 0.0150 |
| Hydrogen | 0.0670 | 0.0670 |
| Nitrogen | 0.3621 | 0.3621 |
| Iso-pentane | 0.0770 | 0.0770 |
| 1-Butene | 0.1145 | 0.1145 |
| n-Butane | 0.0091 | 0.0091 |
| n-Pentane | 0.0095 | 0.0095 |
| Neo-Pentane | 0.0088 | 0.0088 |
| Recycle Gas Density (kg/m$^3$.) | 26.45 | 26.68 |
| Reactor Temperature (° C.) | 86 | 86 |
| Reactor Inlet Temperature (° C.) | 31.4 | 31.4 |
| Reactor Pressure (psig) | 308 | 308 |
| Reactor inlet Pressure (psig) | 320 | 320 |
| Inlet Dew Point Temperature (° C.) | 56.3 | 56.55 |
| Condensed Liquid in Recycle Stream (% weight) | 23.0 | 23.3 |
| Production Rate (ton/h) | 46.14 | 47.17 |

As can be seen from Table 1, the actual data and the data from the model are very well comparable.

Subsequently, a polymerization process in a multi zone reactor was used to carry out the polymerization of ethylene and 1-butene in the condensed mode. The model was firstly run using actual data from commercial polyethylene production in condensed mode to produce a butene-1/ethylene copolymer with 918 kg/m$^3$ density and a melt flow index of 1.0 in accordance with example 6.2 from U.S. Pat. No. 6,759,489 B1 to Turkistani. Subsequently, the model was rerun according to the present invention (cases 1, 2 and 3).

The results are shown in Table 2.

TABLE 2

Simulation results using the process, reactor and polymerization system of the invention.

| | Case Number | | |
|---|---|---|---|
| Reactor Conditions | Case-1 | Case-2 | Case-3 |
| Largest diameter of the inner wall of the third zone (m) | 4.42 | 4.42 | 4.42 |
| Superficial gas velocity of the upper part of the third zone (3B) (m/s) | 0.74 | 0.74 | 0.74 |
| Largest diameter of the inner wall of the second zone (m) | 3.5 | 3.5 | 3.5 |
| Superficial gas velocity of the upper part of the second zone (2B) (m/s) | 1.18 | 1.18 | 1.18 |
| Recycle Gas Composition (mole fraction): | | | |
| Ethylene | 0.3370 | 0.3370 | 0.3370 |
| Ethane | 0.0150 | 0.0150 | 0.0150 |
| Hydrogen | 0.0670 | 0.0670 | 0.0670 |
| Nitrogen | 0.3191 | 0.2791 | 0.3621 |
| Iso-pentane | 0.120 | 0.1600 | 0.0770 |
| 1-Butene | 0.1145 | 0.1145 | 0.1145 |
| n-Butane | 0.0091 | 0.0091 | 0.0091 |
| n-Pentane | 0.0095 | 0.0095 | 0.0095 |
| Neo-Pentane | 0.0088 | 0.0088 | 0.0088 |
| Recycle Gas Density (kg/m$^3$.) | 28.58 | 30.46 | 32.48 |
| Reactor Temperature (° C.) | 86 | 86 | 86 |
| Reactor Inlet Temperature (° C.) | 31.4 | 31.4 | 31.4 |
| Reactor Pressure (psig) | 308 | 308 | 308 |
| Reactor inlet Pressure (psig) | 320 | 320 | 320 |
| Inlet Dew Point Temperature (° C.) | 66.05 | 75.46 | 82.70 |
| Condensed Liquid in Recycle Stream (% weight) | 34.1 | 42.8 | 50.7 |
| Production Rate (ton/h) | 61.14 | 74.12 | 87.47 |

As can be seen from Table 2, the more condensed liquid in the recycle stream (the fluids that are circulated from the top of the multi-zone reactor to the first zone), the higher the production rate. The reactor according to the invention allows for high amounts of liquid in the recycle stream without destabilization of the fluidized bed comprised in the reactor.

By comparing the commercial data in Table 1, where a 33% condensed liquid in the recycle stream would give a production rate of about 46 ton/h with the results obtained in Table 2, for the processes of the invention (cases 1, 2 and 3), an increase or improvement in the production rate from of about 33%, 61% and 89% percent, respectively, was obtained using the process of the invention.

Also, the process of the invention (using the reactor and system of the invention), will have an increased stability (of the fluidized bed) as compared to the commercial polyethylene production process at the same amount of liquid in the recycle stream.

The invention claimed is:

1. A multi-zone reactor suitable for the continuous fluidized bed polymerization of one or more α-olefin monomers of which at least one is ethylene or propylene, which multi-zone reactor is operable in condensed mode, which multi-zone reactor comprises a first zone, a second zone, a third zone, a fourth zone and a distribution plate,
   wherein the first zone is separated from the second zone by the distribution plate, wherein the multi-zone reactor is extended in the vertical direction, wherein the second zone of the multi-zone reactor is located above the first zone, and wherein the third zone of the multi-zone reactor is located above the second zone, and wherein the fourth zone of the multi-zone reactor is located above the third zone, wherein the second zone contains an inner wall, wherein at least part of the inner wall of the second zone is either in the form of a gradually increasing inner diameter or a continuously opening cone, wherein the diameter or the opening increases in the vertical direction towards the top of the multi-zone reactor, wherein the third zone contains an inner wall, wherein at least part of the inner wall of the third zone is either in the form of a gradually increasing inner diameter or a continuously opening cone, wherein the diameter or the opening increases in the vertical direction towards the top of the multi-zone reactor wherein the largest diameter of the inner wall of the third zone is larger than the largest diameter of the inner wall of the second zone.

2. The multi-zone reactor according to claim 1, wherein at least a part of said second zone and/or said third zone contains an inner wall, wherein at least part of the inner wall has a cylindrical shape.

3. The multi-zone reactor according to claim 1, wherein zone (2) in the area directly above the distribution plate is either in the form of a gradually increasing inner diameter or a continuously opening cone (2A), wherein the diameter or the opening increases in the vertical direction towards the top of the multi-zone reactor.

4. The multi-zone reactor according to claim 1, wherein the shape of the third zone is part of the shape of the second zone.

5. The multi-zone reactor according to claim 1, wherein the continuously opening cone or gradually increasing inner diameter extends from the second into the third zone and optionally also from the third into the fourth zone.

6. The multi-zone reactor according to claim 1, wherein zone (2) in the area directly above the distribution plate is either in the form of a gradually increasing inner diameter or a continuously opening cone (2A), wherein the diameter or the opening increases in the vertical direction towards the top of the multi-zone reactor and wherein the top part of the second zone has an inner wall having a cylindrical shape (2B) and wherein the top part of the second zone is connected to a bottom part of the third zone (3A), wherein the bottom part of the third zone is either in the form of a gradually increasing inner diameter or a continuously opening cone, wherein the diameter or the opening increases in the vertical direction towards the top of the multi-zone reactor and wherein the top part of the third zone has an inner wall having a cylindrical shape (3B) and wherein the top part of the third zone is connected to the top zone.

7. The multi-zone reactor according to claim 1, wherein the angle (α) of the inner wall of the part of the second zone having the gradually increasing inner diameter or having the continuously opening cone, relative to the centre line (9) of the multi-zone reactor (8) is from 1 to 40 degrees.

8. A process for the continuous preparation of a polyolefin in the multi-zone reactor of claim 1 from one or more α-olefin monomers of which at least one is ethylene or propylene comprising feeding a solid polymerization catalyst to the multi-zone reactor (8) in the area above the distribution plate (6)

feeding the one or more α-olefin monomers to the multi-zone reactor (8)

withdrawing the polyolefin (30) from the multi-zone reactor (8)

circulating fluids from the top of the multi-zone reactor (8) to the first zone wherein the fluids are cooled to below their dew point, resulting in a bottom recycle stream, and wherein the bottom recycle stream is introduced into the first zone wherein the rate of superficial gas velocity is in the range of 0.5 to 5 m/s.

9. A system suitable for continuous polymerization of one or more α-olefin monomers of which at least one is ethylene or propylene comprising the multi-zone reactor (8) of claim 1.

10. The system according to claim 9 further comprising a compressor (400) and a cooling unit (5), wherein the first zone comprises a first inlet for receiving a bottom recycle stream (10), wherein the second zone (2) comprises a first inlet for receiving a solid polymerization catalyst (20), wherein the second zone (2) and/or the third zone (3) comprises a first outlet for providing polyolefin (30), wherein the fourth zone (4) comprises a first outlet for a top recycle stream (40), wherein the first outlet for the top recycle stream (40) of the fourth zone is connected to a first inlet of the compressor (400) via a first connection means (AA), wherein the compressor (400) comprises a first outlet for compressed fluids (50), wherein the first outlet of the compressor (400) is connected to a first inlet for compressed fluids of the cooling unit (5) via a second connection means (BB), wherein optionally the second connection means (BB) comprises a first inlet for receiving a feed (70), wherein the cooling unit (5) comprises a first outlet for providing the bottom recycle stream (10) which first outlet of the cooling unit (5) is connected to the first inlet of the first zone wherein the first connection means (AA) comprises a first inlet for receiving a feed (60).

11. The process for continuous polymerization of one or more α-olefin monomers of which at least one is ethylene or propylene in the system of claim 10 comprising supplying the second zone (2) with a solid polymerization catalyst using the first inlet for receiving the solid polymerization catalyst (20)

supplying a feed (60) comprising an α-olefin monomer to the first connection means (AA)

optionally supplying a feed (70) comprising condensable inert components to the second connection means (BB)

withdrawing the polyolefin (30) using the first outlet of the second zone (2) and/or the third zone (3) and circulating fluids from the first outlet of the fourth zone (4) to the first inlet of the first zone wherein the fluids are circulated by compressing the feed (60) and the top recycle stream (40) using the compressor (400) to form the compressed fluids (50)

subsequently cooling the compressed fluids (50) using the cooling unit (5) to below the dew point of the compressed fluids to form the bottom recycle stream (10) and feeding the bottom recycle stream (10) to the first zone of the multi-zone reactor (8) via the inlet for receiving the bottom recycle stream of the first zone, and wherein the superficial gas velocity in this process is in the range of 0.5 to 5 m/s.

12. The process according to claim 11, wherein a gas-liquid polymerization is conducted in the second zone and a gas phase polymerization is conducted in the third zone.

13. The process according to claim 11, wherein:
the feed (60) comprises a chain transfer agent; and/or
the feed (70) comprises condensable inert components; and/or
in case of a non-condensable comonomer, feed (60) or (70) is used for supplying a comonomer, and in case of a condensable comonomer, feed (70) is used for supplying a comonomer.

14. The multi-zone reactor according to claim 6, wherein the top part of the third zone is connected to the fourth zone.

15. The process according to claim 13, wherein the feed comprises hydrogen.

16. The process according to claim 13, wherein the feed comprises condensable α-olefin monomers, α-olefin comonomers and/or mixtures thereof.

\* \* \* \* \*